(12) United States Patent
Ebihara

(10) Patent No.: US 7,370,937 B2
(45) Date of Patent: May 13, 2008

(54) COLOR IMAGE RECORDING APPARATUS

(75) Inventor: Toshiyuki Ebihara, Tokyo (JP)

(73) Assignee: Olympus Corporation, Tokyo (JP)

( * ) Notice: Subject to any disclaimer, the term of this patent is extended or adjusted under 35 U.S.C. 154(b) by 313 days.

(21) Appl. No.: 11/175,819

(22) Filed: Jul. 6, 2005

(65) Prior Publication Data

US 2006/0012617 A1    Jan. 19, 2006

(30) Foreign Application Priority Data

Jul. 15, 2004    (JP) .............................. 2004-209179

(51) Int. Cl.
*B41J 2/155*    (2006.01)
(52) U.S. Cl. ................. 347/42; 347/5; 347/13
(58) Field of Classification Search .............. 347/5, 347/15, 41, 43, 13, 40, 42
See application file for complete search history.

(56) References Cited

U.S. PATENT DOCUMENTS 6,027,203 A * 2/2000 Campbell .................... 347/42

FOREIGN PATENT DOCUMENTS

JP    5-330088 A    12/1993

* cited by examiner

*Primary Examiner*—Matthew Luu
*Assistant Examiner*—Henok Legesse
(74) *Attorney, Agent, or Firm*—Frishauf, Holtz, Goodman & Chick, P.C.

(57) ABSTRACT

Select a recording element corresponding to a predetermined number of dots for each color forming the same pixel from each color recording head, calculate a shift amount of each color image data based on the respective relative positions of recording element of each color recording head forming the selected same pixel and shift image data of each applicable color based on the calculation result. In the event, select each color dot where a distribution range of different color dot positions of a predetermined number of dots for each color becomes a minimum, from among a plurality of dots formed by a plurality of recording elements of the recording head for each color, and select a recording element of each color recording head forming the selected dot.

4 Claims, 10 Drawing Sheets

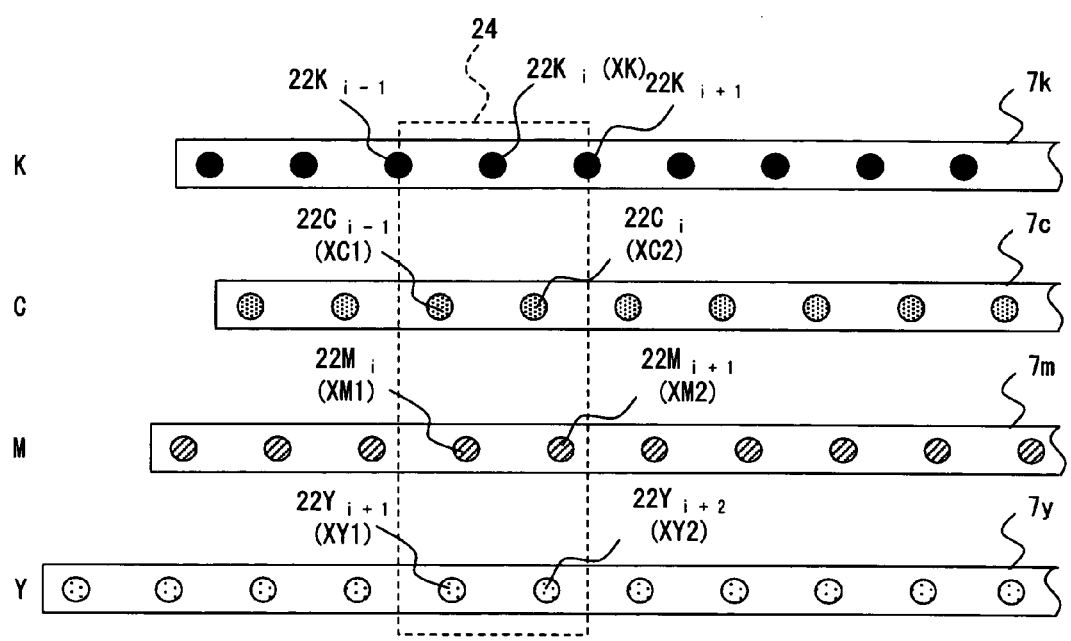
F I G. 6

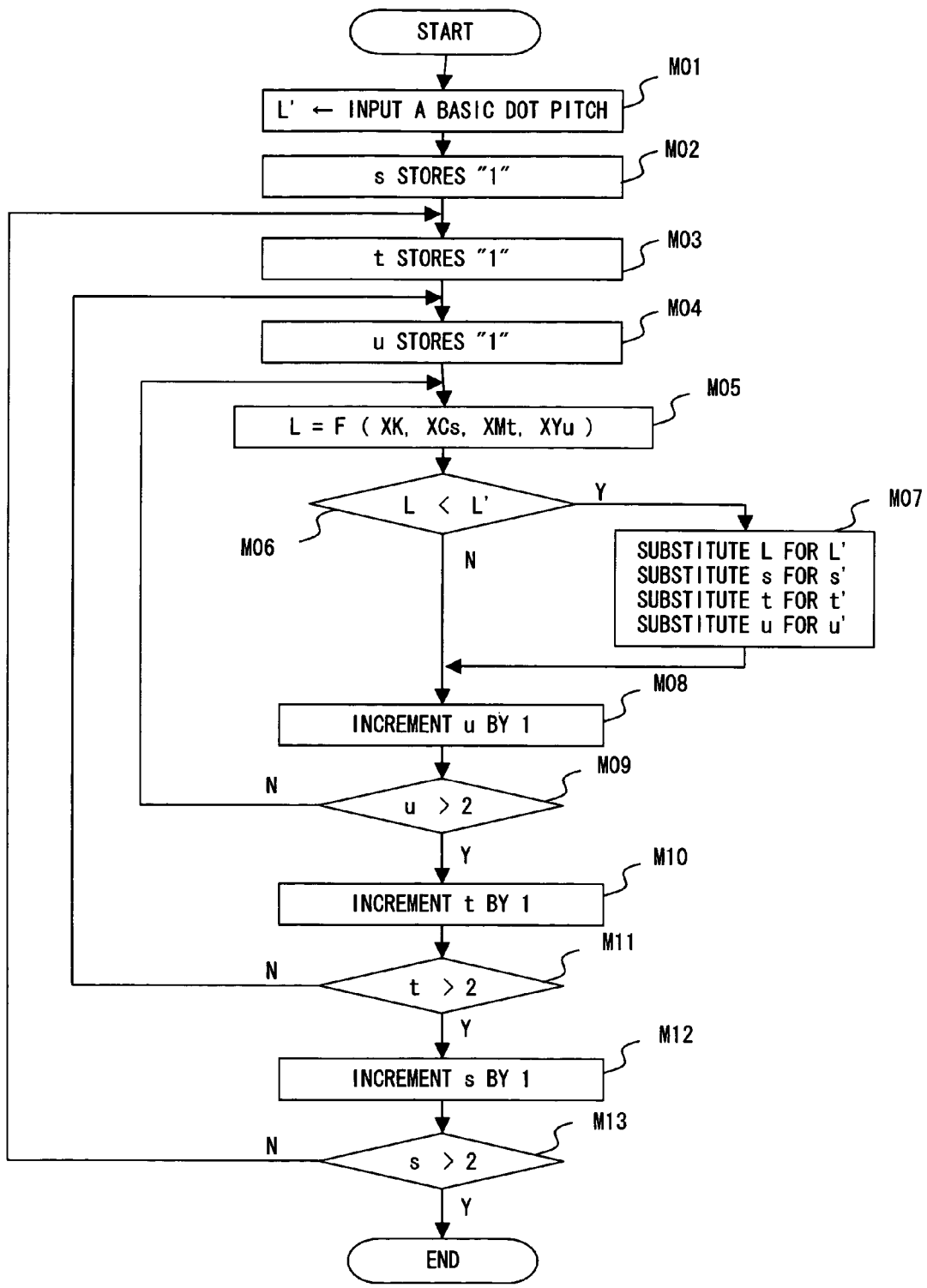
F I G. 7

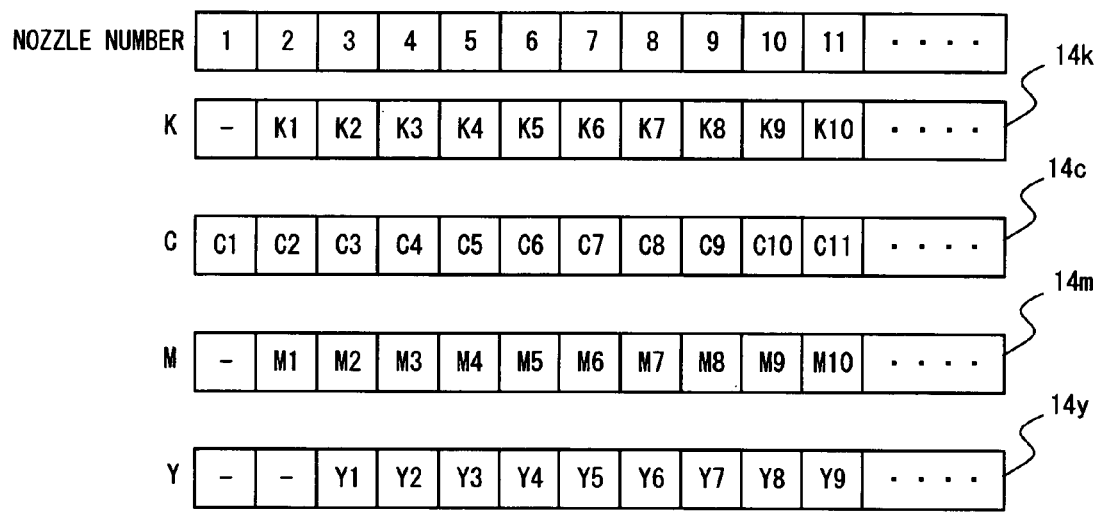
F I G. 10

COLOR IMAGE RECORDING APPARATUS

CROSS REFERENCE TO RELATED APPLICATION

This application is based upon and claims the benefit of priority from the prior Japanese Application No. 2004-209179, filed Jul. 15, 2004, the entire contents of which are incorporated herein by reference.

BACKGROUND OF THE INVENTION

1. Field of the Invention

The present invention relates to an image recording apparatus, etcetera, such as printer, facsimile, copying machine, and specifically to a color image recording apparatus for carrying out a color recording by using line inkjet heads, each of which comprising a plurality of ink ejection nozzles, by the number of heads corresponding to that of colors.

2. Description of the Related Art

Conventionally, inkjet color printers (i.e., color image recording apparatuses) have generally been categorized into two types in terms of difference in recording operations of the inkjet head against a recording sheet at recording thereon.

One type is called a serial printer in which an inkjet head travels back and forth in a horizontal scan direction while a recording sheet is transported in a vertical scan direction.

The other type is called a line printer in which an inkjet head ("line head" hereinafter unless otherwise noted) is furnished fixedly in the main apparatus across the length of an approximate width of the recording sheet and the recording sheet runs in a direction of paper feeding crossing the line head.

In a line printer capable of color recording among the above noted line printers, four color inks (i.e., K for black, C for cyan, M for magenta, and Y for yellow) are usually used, with one line head for each color being furnished. And these four line heads are furnished serially in the direction of transporting the recording sheet.

In such a color line printer, the position of each line head per color must be finely adjusted in order to position each color with one another. Otherwise an image quality will be remarkably reduced, resulting in recognition of a blurred image for its entirety.

An adjustment of each of the above noted line heads where they are mounted must be such that four color recording dots constituting one pixel of an image land on the respective same positions of the recording sheet. This would be easy for a line head with a low resolution made up with a nozzle array pitch of 5 dots per millimeter for instance. However, adjusting line heads of high resolution in a high precision, with a nozzle array pitch of anywhere between one micron and tens of microns (i.e., is to 10 s micrometers) for instance, will be faced by a great technical difficulty.

This will require a great deal of effort and time in assembling a color printer, bringing forth a constraint on improving the assembly process efficiency.

In order to solve such a problem, a technique has been proposed to reduce a positional displacement of recording dots of four color recording dots in a serial inkjet printer to one half pitch or less by making a storing position of image signal variable within the recording buffers of respective colors based on the recording head for the color specified for the most downstream in the slow scan direction (e.g., refer to a Japanese patent laid-open application publication No. 05-330088, paragraph [0047] and FIG. 4).

If a cyan recording dot is displaced leftward by almost one half pitch vis-á-vis a black recording pitch position and a magenta recording dot is displaced rightward by that much vis-á-vis the black, however, the center distance between the cyan and magenta recording dots will end up with about one pitch.

SUMMARY OF THE INVENTION

A color image recording apparatus according to the present invention comprises a plurality of recording heads respectively corresponding to a plurality of ink colors for recording an image; a recording element selection process for selecting a recording element which forms a predetermined number of dots per color constituting a predetermined pixel from each applicable color recording head based on information about respective relative positions of the plurality of recording heads; a shift amount calculation process for calculating an amount of shift in each color image data based on a relative position of recording element for each color forming the same pixel which has been selected by the recording element selection process; and a shift process for shifting each color data by an applicable amount based on a calculation result in the shift amount calculation process, wherein the recording element selection process selects each color dot so that a distribution range of a predetermined number of dot positions is a minimum for the applicable color from among a plurality of dots respectively formed by a plurality of recording elements of each color recording head, and selects a recording element of each color recording head forming the selected dots as a recording element constituting the same pixel.

BRIEF DESCRIPTION OF THE DRAWINGS

FIG. 6 exemplifies a mounting positional relationship among four recording heads;

FIG. 7 is a flow chart describing a processing for determining a combination where a distribution range becomes a minimum in the direction of X-axis, based on a definition of the function F (k, c, m, y) and a logic for locating positions with regard to eight combinations of other recording dots vis-á-vis a focus recording dot;

FIG. 10 shows a state of each line buffer storing image data shown by FIG. 5 as pixel data which are based on the amounts of shift calculated according to the value of s', t' and u'.

DESCRIPTION OF THE PREFERRED EMBODIMENTS

The following is a detailed description of the preferred embodiment of the present invention while referring to the accompanying drawings. Let it define that an image data means a data for an entire image, a pixel is the minimum unit for digitally expressing an image, and a pixel data means a data or signal for expressing (or printing) a pixel.

Figure 1:
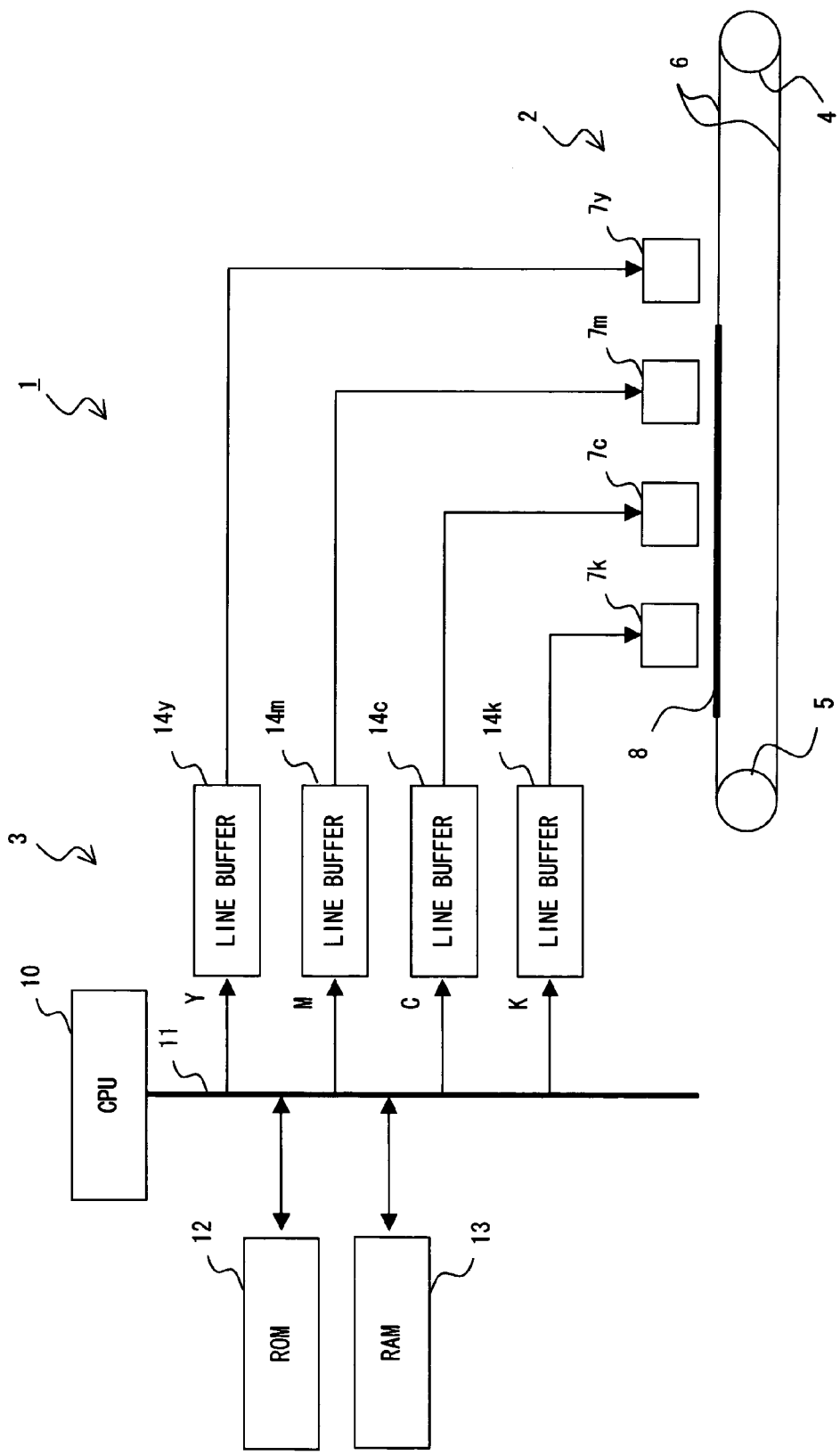
FIG. 1 is an illustrative block diagram showing a comprisal of color image recording apparatus according to a preferred embodiment of the present invention.

FIG. 1 is an illustrative block diagram showing a comprisal of a color inkjet printer (i.e., image recording apparatus) according to a preferred embodiment of the present invention. In FIG. 1, the color inkjet printer 1 comprises an image forming unit 2 and a control unit 3.

The image forming unit 2 comprises a drive roller 4, a driven roller 5, an endless platen belt 6 mounted between the drive roller 4 and driven roller 5 with a flat surface and in tension and four line inkjet heads (i.e., simply "recording heads" hereinafter) 7 (including 7k, 7c, 7m and 7y) which are mounted facing the upper surface of, and in parallel and multi-stage in the direction of the platen belt circulating around (i.e., in the direction of transporting a recording sheet).

Note that FIG. 1 omits from showing a drive apparatus for the drive roller 4, a sheet feeding apparatus for feeding out a recording sheet 8 which is then transported by the platen belt 6, et cetera.

And the control unit 3 shown by FIG. 1 comprises a CPU (central processing unit) 10, a ROM (read only memory) 12, RAM (random access memory) 13, and four line buffers 14 (including 14y, 14m, 14c and 14k) for retaining a pixel data of externally inputted color image data per each line in the fast scan direction, which are all connected with the CPU 10 by way of a bus 11.

These four line buffers 14y, 14m, 14c and 14k supply the recording heads 7y, 7m, 7c and 7k, respectively, with image data of respective colors.

Figure 2:
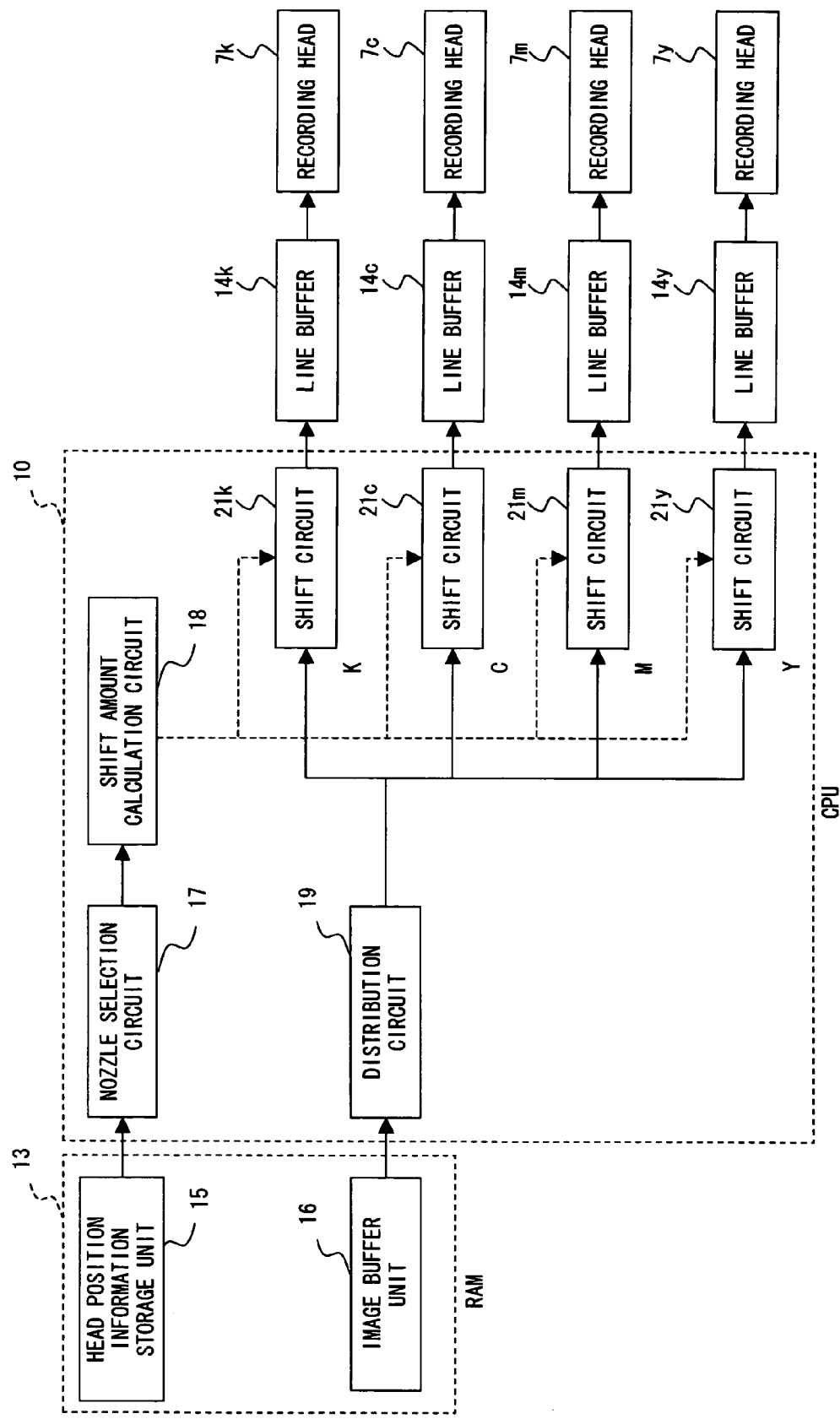
FIG. 2 is a block diagram showing an internal comprisal of RAM and an operation of CPU, shown by the equivalent circuits, comprised by a color image recording apparatus.

FIG. 2 is a block diagram showing an internal comprisal of RAM and an operation of CPU, shown by the equivalent circuits. As shown by FIG. 2, RAM 13 comprises a head position information storage unit 15 and an image buffer unit 16, both as storage areas.

The head position information storage unit 15 stores head position information indicating a positional relationship of ink ejection nozzles (simply "nozzles" hereinafter) of each recording head 7 (i.e., 7k, 7c, 7m and 7y) as a result of external input in advance.

The head position information is the relative positional information of each recording head 7, which can easily be figured out through an analysis of image obtained by a pattern printing followed by an image scanning thereof.

And the image buffer unit 16 stores sequentially as image data is externally inputted thereto.

Although not specifically shown in a drawing, the RAM 13 also comprises a work area as storage area to be used by the CPU 10 for reading and writing operation's data, et cetera, temporarily, in addition to the head position information storage unit 15 and image buffer unit 16.

The CPU 10, on the other hand, comprises a nozzle selection circuit 17, a shift amount calculation circuit 18, a distribution circuit 19 and four shift circuits 21 (i.e., 21k, 21c, 21m and 21y).

While it will be described in detail later, the nozzle selection circuit 17 selects a nozzle corresponding to a recording dot with which a distribution range of respective color dots forming the one image pixel becomes a minimum based on the head position information stored by the head position information storage unit 15 and outputs the selection result to the shift amount calculation circuit 18.

The shift amount calculation circuit 18 calculates a shift amount data in relation to a nozzle at the reference position for each color image signal constituting one pixel based on the above described selection information and outputs the calculated shift amount data to the applicable shift circuit 21.

The distribution circuit 19 separates a pixel data having been read out of the image buffer unit 16 into a pixel data of each color and outputs the color-separated pixel data to the respective shift circuit 21 corresponding to each color.

Each of the shift circuits 21 stores a pixel data inputted from the distribution circuit 19 as a pixel data shifted according to the shift amount data inputted from the shift amount calculation circuit 18 in the line buffer 14 as a memory.

Figure 4:
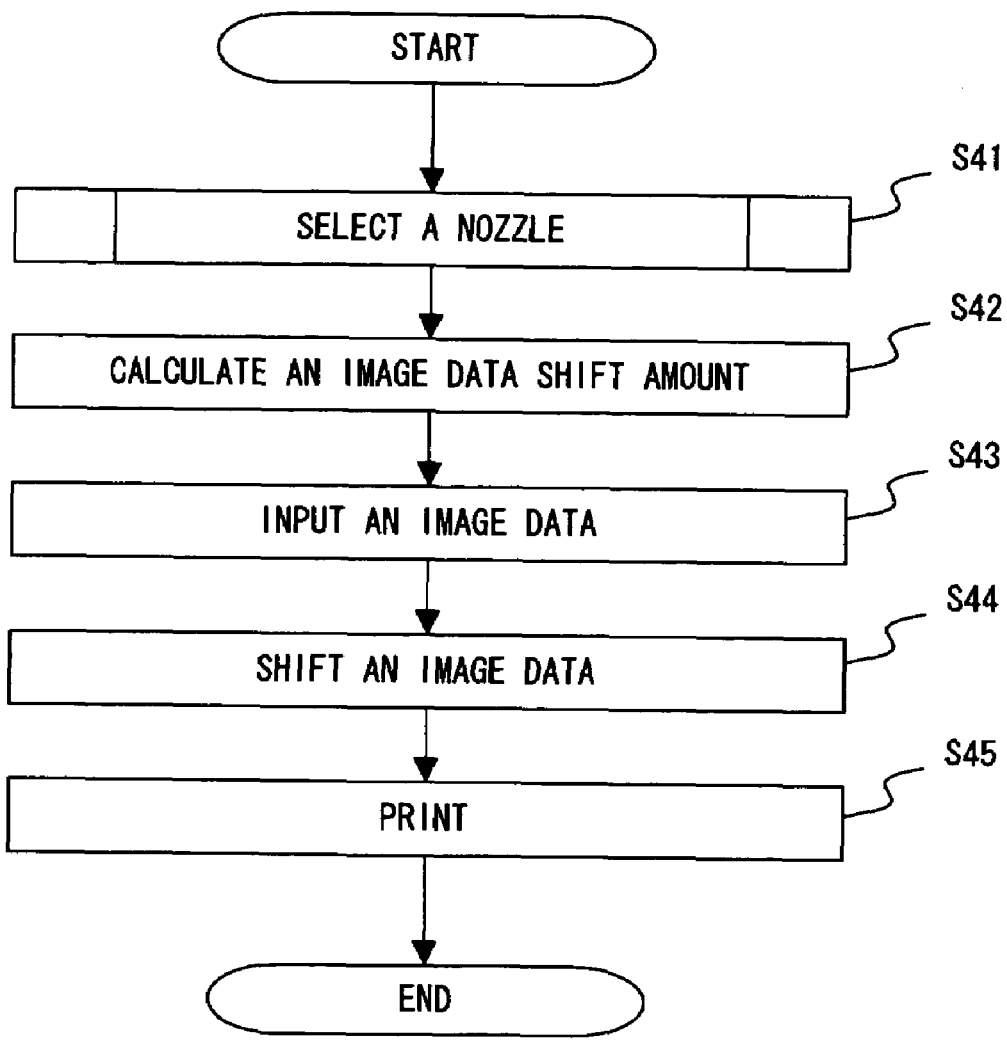
FIG. 4 is a flow chart describing a processing operation with regard to a printing process in a color image recording apparatus.

FIG. 4 is a flow chart describing a processing operation with regard to a printing process in the above comprised color inkjet printer.

The following describes an outline of printing operation while referring to FIG. 4.

First process is to select a nozzle of each color recording head corresponding to the same pixel (S41). The nozzle selection circuit 17 carries out this processing.

Figure 3:
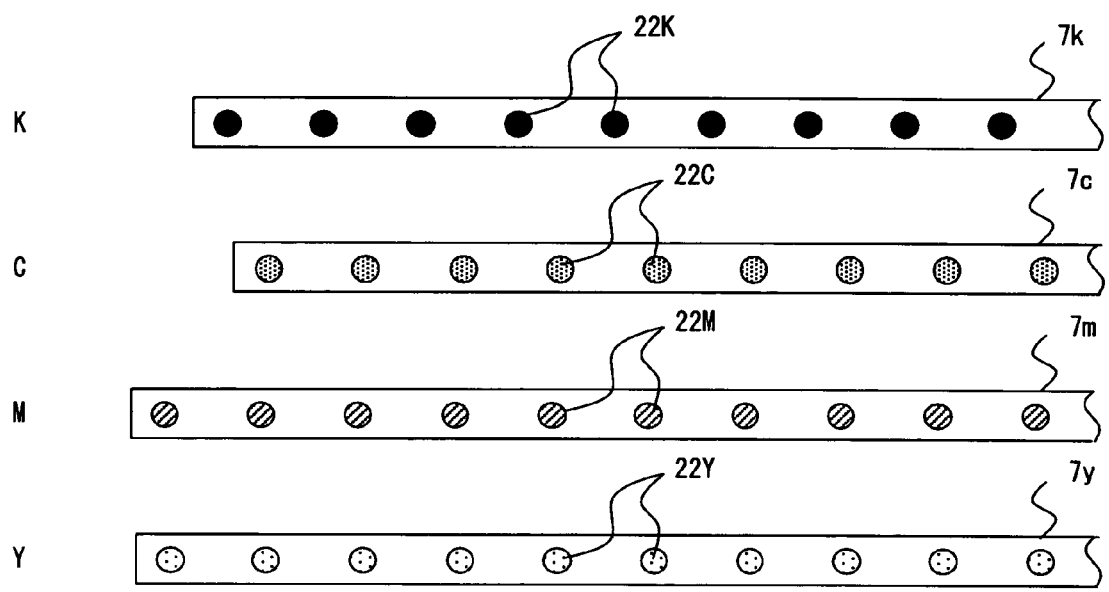
FIG. 3 exemplifies a relative mounting positional relationship of four recording heads in a color image recording apparatus.

The nozzle selection circuit 17 determines (i.e., selects) a corresponding relationship of nozzle (i.e., recording element) 22 (i.e., 22K through 22Y shown by FIG. 3) of each color recording head 7 for forming the same pixel based on the head position information stored by the head position information storage unit 15 comprised by the RAM 13.

Then, calculate an image data shift amount (S42) The shift amount calculation circuit 18 carries out this processing.

The shift amount calculation circuit calculates a shift amount of image data for each color to be supplied to each nozzle based on the corresponding relationship of the nozzle 22 of each recording head 7 determined by the nozzle selection circuit 17.

Then, input an image data (S43). This processing is to store the image data inputted to the color inkjet printer 1 in the image buffer unit 16 comprised by the RAM 13.

Figure 5:
FIG. 5 illustrates a state of image data being stored in a page buffer unit comprised by a RAM.

FIG. 5 illustrates a state of image data being stored by the above described page buffer unit 16.

In FIG. 5, each window in four rows under the nozzle number in the top row shows a pixel data, indicating pixel data for the black K recording head by K1, K2, K3 and so on; that for the cyan C recording head by C1, C2, C3 and so on; that for the magenta M recording head by M1, M2, M3 and so on; and that for the yellow recording head by Y1, Y2, Y3 and so on.

The pixel data of the same number for each head for K, C, M and Y is the pixel data for each color corresponding to the same pixel.

A desired image by the unit of pixel is printed (i.e., expressed) if an ink droplet based on each pixel data of K1, C1, M1 and Y1, for example, lands on the exact same spot.

At this stage, pixel data for each color is stored with the pixel data of the same number as the nozzle number corresponding to the same nozzle number, assuming that the nozzle of the same number for each recording head corresponds to the same pixel.

That is, the image data for each color is stored under the assumption that the respective mounting positions of all color recording heads are not displaced with one another.

Then, shift the image data (S44). This is a processing that each of the four shift circuits 21 shifts the image data for the applicable color.

Each shift circuit 21 stores the pixel data inputted from the distribution circuit 19 in the line buffer 14 while shifting it based on the shift amount data inputted from the shift amount calculation circuit 18.

Following the above described processing, carry out a printing (S45). In this printing processing, each recording head 7 ejects ink droplets from the respective nozzles to form an image on a recording medium based on the pixel data stored by the above described line buffers 14 respectively.

The next description is on the nozzle selection processing in the S41 shown by above described FIG. 4.

FIG. 6 exemplifies a position of each recording head, and that of the nozzle, in a state of four inkjet heads being mounted on a printer.

The following is a nozzle selection processing S41 in the printer which has such a positional relationship between the recording head and the nozzles.

For starting the nozzle selection processing S41, first, let each recording head eject an ink droplet from each nozzle and read the ink dot positions on the recording medium by an image scanner to figure out a position of each color recording head from the reading of the image scanner.

Note here, the following description is based on the assumption that a nozzle pitch is constant on each recording head, and the position of ink dots are the same as that of nozzles in the recording head (that is, a curved flight path of ink droplets or the like will not be existent).

Meanwhile, in FIG. 6, let a nozzle 22Ki at a discretionary position number i in the black K recording head 7k be the reference, and the X-coordinate of the nozzle 22Ki be the coordinate XK.

Figure 8:
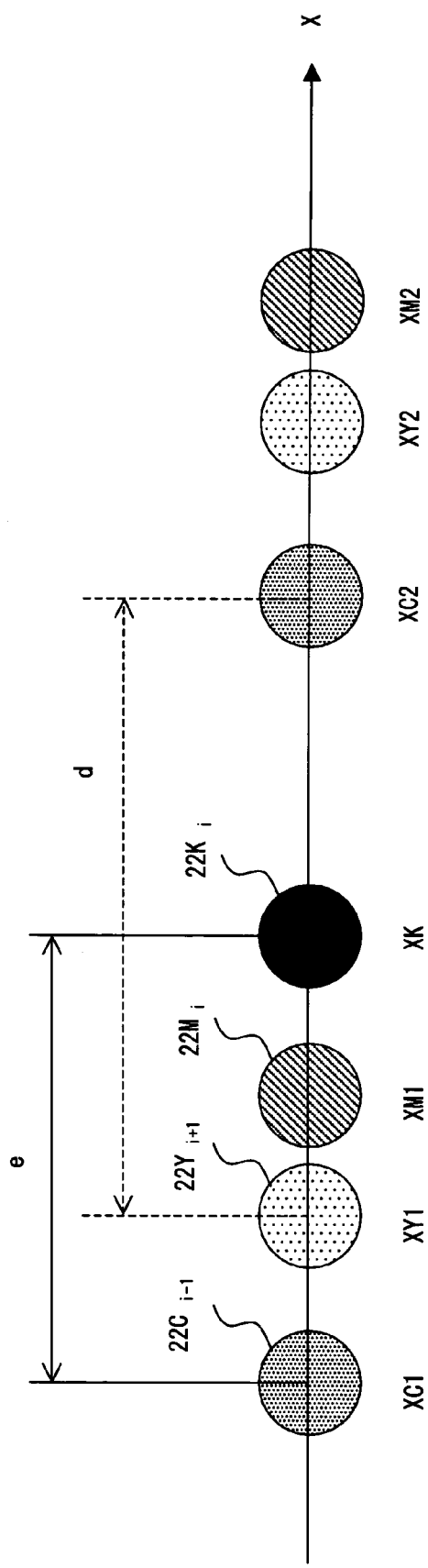
FIG. 8 shows a distribution range e (=L') of recording dots constituting the same pixel.

And let it consider about the nozzles 22C, 22M and 22Y of the other color recording heads 7c, 7m and 7y, respectively, existing in the area 24 which borders in nozzles adjacent to the nozzle 22Ki on the left and right sides, i.e., 22Ki−1 and 22Ki+1; and let the X-coordinates of nozzles 22Ci−1, 22Mi and 22Yi+1 which are located on the left side of the nozzle 22Ki (at X-coordinate=XK) be XC1, XM1 and XY1, respectively, while that of the nozzles 22Ci, 22Mi+1 and 22Yi+2 which are located on the right side of the nozzle 22Ki be XC2, XM2 and XY2, respectively. FIG. 8 shows the positions of dots recorded by these nozzles.

Here, the assumption is that the displacements between the positions of respective color nozzles 22K, 22C, 22M and 22Y, all shown by FIG. 6, and those of recording dots formed by the ink droplets ejected from these nozzles, as shown by FIG. 8, are negligibly small.

Accordingly, the current description continues with the assumption that the position of each color nozzle and that of each recording color dot is the same for all colors, respectively. Likewise, symbols are the same between a nozzle and the recording dot.

First, let the function F (k, c,m, y) be as follows:

$$F(k, c, m, y) = \text{Max}(k, c, m, y) - \text{Min}(k, c, m, y);$$

where k, c, m and y express X-coordinates of discretionary recording dots of K, C, M and Y; Max (k, c, m, y) expresses the one with the maximum X-coordinate among each dot of the selected k, c, m and y; and Min (k, c, m, y) expresses the one with the minimum X-coordinate among each dot of the selected k, c, m and That is, the function F (k, c, m, y) expresses the distribution range of recording dots 22K 22C, 22M and 22Y positioned at the coordinates of k, c, m and y, respectively.

Generally speaking, if a plurality of recording heads (i.e., four in the present embodiment) are mounted without a precision adjustment as shown by FIG. 6, each of recording dots of other colors will be formed at a displaced position instead of being overlapped with the reference recording dot of the focus color (i.e., recording dot 22Ki in the example of FIG. 8) in most cases.

Accordingly, selecting either one of the two recording dots sandwiching the black K reference recording dot for a recording dot of each color, i.e., cyan C, magenta M and yellow Y, other than black K, and inputting the pixel data of the same number as the reference recording dot of black K to form a recording dot.

There are two selectable recording dots vis-á-vis the color K recording dot for each color, i.e., C, M and Y, for a printing process using four colors, i.e., K, C, M and Y, and therefore eight combinations of respective color nozzles will result.

An examination of each dot position for the eight combinations of each recording dot enables a discovery of combination in which the distribution range of the four color recording dots becomes small.

FIG. 7 is a flow chart describing a processing for determining a combination where a distribution range becomes a minimum in the direction of X-axis, based on the definition of the function F (k, c, m, y) and a logic for locating positions with regard to eight combinations of other recording dots vis-a-vis a focus recording dot.

Note that this processing sets up register zones of L, s, t, u, L', s', t', and u' in a work area of RAM 13.

And, let it define the reference recording dot as 22Ki, and the X-coordinate thereof as XK, as shown by FIG. 8.

And in FIG. 8, let the X-coordinates of the cyan C, magenta M and yellow Y recording dots which are on the left side of the recording dot 22Ki be XC1, XM1 and XY1, respectively, while the X-coordinates of the cyan C, magenta M and yellow Y recording dots which are on the right side of the recording dot 22Ki be XC2, XM2 and XY2, respectively.

In the processing of flow chart shown by FIG. 7, first, the register L' stores the basic dot pitch (M01) In this processing, the nozzle pitch of each recording head 7, such as "100," meaning 100 micrometers, is stored in the register L' as the basic dot pitch.

The above step is followed by the registers storing "1" (M02). This processing is for specifying a cyan C recording dot located at XC1.

The above step is followed by the register t storing "1" (M03). This processing is for specifying a magenta M recording dot located at XM1.

Further followed by the register u storing "1" (M04) This processing is for specifying a yellow Y recording dot located at XY1.

At this stage, calculate F(XK, XCs, XMt, XYu) to substitute the calculation result for the register L (M05).

In this processing, since s=1, t=1 and u=1 for the processing in the steps of M02, M03 and M04, respectively, to begin with, therefore the distribution ranges for F(XK, XC1, XM1, XY1), that is, for combinations between XK and XC1, XM1 and XY1 on the left side thereof are calculated and the calculation results will be substituted for the register L.

Then followed by judging whether or not the above calculation result L is smaller than the initially set, basic dot pitch L' (M06).

And, if L≧L' (i.e., "no" for M06), meaning the calculated distribution range is larger than the basic dot pitch L' and that a selection of this combination is inappropriate, the processing of M08 will ensue for determining a next combination, instead of selecting the aforementioned combination.

On the other hand, if L<L' in the above described judgment (i.e., "yes" for M06), meaning the calculated distribution range is smaller than the basic dot pitch L', select this combination.

That is, substitute the selected L for L' and the coordinate numbers for recording dots of other colors, i.e., s, t and u, other than the black, as components for the distribution range, for s', t' and u', respectively (M07).

The above described processing changes the value of basic dot pitch L' to the calculated distribution range and, at the same time, the coordinates of recording dots of three colors, other than the black, constituting the basic dot pitch L' to the coordinates at the time of calculation. Then the processing of M08 ensues for determining the next combination.

The processing of M08 increments the value of the register u by one (1), followed by the processing M09 for judging whether or not the value of the register u exceeds two (2).

This processing is for judging whether or not the recording yellow Y dot determined for the combination is located farther right than the yellow Y recording dot at the immediate right of the reference black K recording dot.

And the judgment result is "no," since the value of the register u is "u=1+1=2" for the first round of the processing, making it possible to know that the determined yellow Y recording dot is the one located at the immediate right to the black K recording dot.

In this case, go back to the processing M05 for calculating the distribution range for the combination F(XK, XC1, XM1, XY2), followed by a judgment of the processing M06 again.

The processing M06 compares the distribution range L for the combination F(XK, XC1, XM1, XY2) with the L' followed by the processing M07 as described above or the processing M08 directly depending on the comparison result.

The processing M08 increments the value of the register u by one (1), resulting in u=3, thus a judgment in the processing M09 becoming "yes" and incrementing the value of the register t by one (1) (M10).

Then followed by judging whether or not the value of the register exceeds two (2) (M11). This processing is also to judge whether or not the magenta M recording dot determined for the combination is a dot other than the two magenta M recording dots sandwiching the reference black K recording dot, that is, the one located farther right of the magenta M recording dot on at the immediate right of the reference black K recording dot.

In the judgment of M11, the judgment result is "no" since the value of the register t is "t=1+1=2". That is, to make it possible to know that the magenta M recording dot to be determined next will be located at the right of the black K recording dot.

In this case, resume the processing M04 to turn the value of the register u back to "1", followed by calculating the distribution range of the combination F(XK, XC1, XM2, XY1) in the processing M05, further followed by a judgment in the processing M06 again. Then, after carrying out the above described processing M07, or skipping the above descrived processing M07, processing M08 increments the value of the register u by one (1).

Here, the register u has been one (1) substituted in the processing M04 and therefore the u is not yet exceeding two (2) even after the processing M08 incrementing by one (1).

Therefore, the judgment result of the processing M09 in "no", followed by going back to the processing M05 for calculating the distribution range of the combination F(XK, XC1, XM2, XY2) to carry out a judgment of the processing M06.

Depending on the result of the processing M06, the processing goes through M07 and M08, or directly to M08, to increment the value of register u by one (1).

As a result of the above, the u=3 will turn the judgment result for the processing M09 to "yes", followed by proceeding to the processing M10 which increments the value of the register t by one (1), hence turning to the t=3. Accordingly the judgment result for the processing M11 becomes "yes", and the processing M12 will ensue.

The processing of M12 increments the value of the register s by one (1), hence resulting in the s=2.

Then the ensuing processing M13 judges the value of the register s not exceeding two (2), going back to the processing M03 to turn the value of the register t back to "1" in this event, further followed by the processing M04 to turn the value of the register u to "1", the processing M05 to calculate the distribution range for the combination F(XK, XC2, XM1, XY1) and the processing M06 for another judgment.

A repetition of the above described processing for calculating the distribution ranges for all eight combinations will find out a combination of respective color recording dots having the minimum distribution range.

As described above, the function F(XK, XCs, XMt, XYu) is defined by letting the coordinate of the reference black recording dot be XK, and the coordinates of two recording dots sandwiching the aforementioned black K recording dot for each of the three other colors be expressed by the respective indicators for three colors, i.e., the indicator "s" for cyan C coordinates, "t" for magenta M coordinates and "u" for yellow Y coordinates. Then, using the function F(XK, XCs, XMt, XYu), the reference dot pitch L' is compared with the distribution range L made up of 8 combinations obtained by substituting one (1) (for a recording dot located on the left side of the black K dots) and two (2) (for a recording dot located on the right side of the black K dots), sequentially one after another for the indicators for three colors.

That is, the sequential comparisons are for: L=F(XK, XC1, XM1, XY1); L=F(XK, XC1, XM1, XY2); L=F(XK, XC1, XM2, XY1); L=F(XK, XC1, XM2, XY2); L=F(XK, XC2, XM1, XY1); L=F(XK, XC2, XM1, XY2); L=F(XK, XC2, XM2, XY1); L=F(XK, XC2, XM2, XY2).

Then, a selection of a combination of each color recording dot forming the same pixel is carried out by obtaining the value of s, t and u which make the value of L become a minimum.

The above described processing according to the present embodiment will select the combination of recording heads where the distribution range becomes an "e" shown by FIG. 8.

That is, the combination of the reference black K recording dot 22Ki, cyan C recording dot 22Ci−1, magenta M recording dot 22Mi, and yellow Y recording dot 22Yi+1 as a recording dot for forming the same pixel.

The distribution range e(=L') of all color recording dots obtained here is understood to be smaller than that obtained by the conventional technique (i.e., shown by the dotted line d in FIG. 8).

Figure 9:
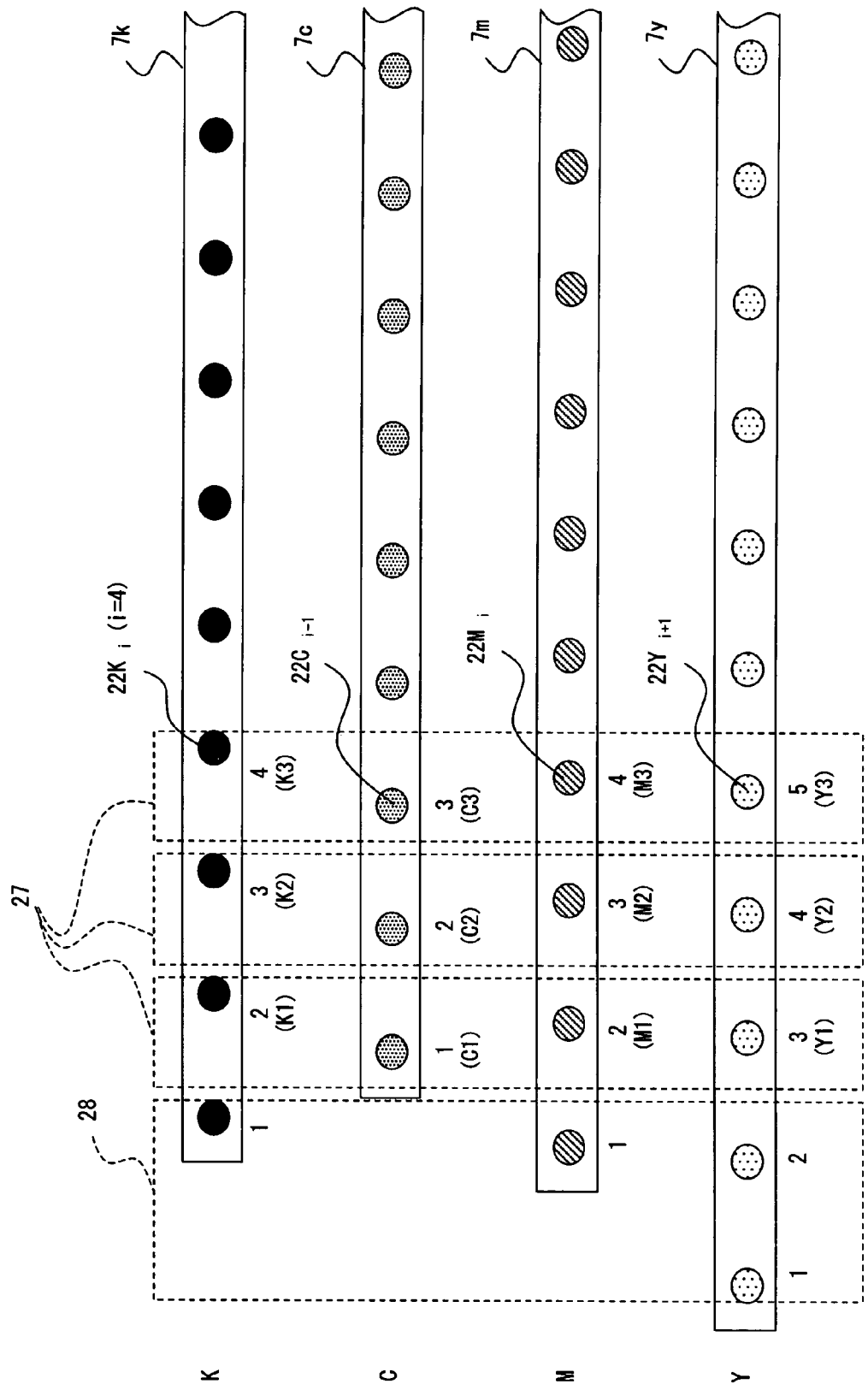
FIG. 9 shows a corresponding relationship between nozzles of respective recording heads and pixel data supplied to the nozzles, respectively, based on amounts of shifts of image data obtained from the values of s', t' and u' where a distribution range shown by FIG. 8 becomes e (=L')

FIG. 9 shows a corresponding relationship between nozzles of respective recording heads and pixel data assigned to the nozzles, respectively, based on amounts of shifts of image data obtained from the values of s', t' and u' where a distribution range becomes e(=L') as shown by FIG. 8.

In FIG. 9, shown are the area 27 containing the selected nozzles for the same pixel and the area 28 containing unused nozzles as a result of the nozzle selection processing for searching for a combination of nozzles constituting the above described minimum distribution range.

In the present embodiment, the area 28 containing unused nozzles also contains one of the reference black K nozzle, and therefore the image data for black K will be shifted by one.

Accordingly, the nozzle 22Ki (i=4) of the reference black K recording head will be assigned by the black pixel data Ki−1 (i.e., K3 shown by FIG. 9) of the shifted number i−1 by one pixel.

Meanwhile, the area 28 containing unused nozzles actually contains one of magenta M nozzles and two of yellow Y nozzles, whereas no cyan C nozzle.

Accordingly, the magenta M image data will be shifted by one and the yellow Y image data will be shifted by two, while cyan C image data will not be shifted.

That is, in the example of i=4, the nozzles 22Ci−1, 22Mi and 22Yi+1 will be allocated by the pixel data C3, M3 and Y3 of the same pixel number i−1 as the black K nozzle 22Ki.

FIG. 10 shows a state of each line buffer storing an image data shown by FIG. 5 as the pixel data based on a calculated amount of shift.

As shown by FIG. 10, when storing in the line buffers 14 as the pixel data by line, the line buffers 14*k* and 14m stores the data by shifting by one vis-á-vis the nozzle numbers, as shown in FIG. 9 by the corresponding relationship between a selected nozzle and the pixel data.

Meanwhile, the line buffer 14*c* stores the data without a shift; and the line buffer 14*y* stores the data by shifting vis-á-vis the nozzle numbers by two.

This makes it possible to record the four color recording dots, i.e., black, cyan, magenta and yellow, constituting the same pixel by a minimum distribution range shown by the range "e" in FIG. 8.

As described above, the present invention makes it possible to minimize the positional displacement of each color recording dot constituting a color image easily and quickly even if a plurality of recording heads used for printing are mounted without going through a high precision positional adjustment, and therefore it is possible to not only improve the image quality of a recorded image easily but also a work efficiency in assembly process of a color image recording apparatus, thereby reducing the production cost.

Note that the above described embodiment calculates the combinations of four color nozzles so as to minimize the distribution range of all four colors when carrying out a four-color recording using K, C, M and Y, the configuration, however, may be to calculate the combination for minimizing the distribution range of recording dots by using three colors, e.g., K, C and M, while removing the Y whose positional displacement is visibly insignificant, and to simply select the Y nozzles the closest to the K nozzles.

Also note that the above described embodiment deals simply with a color image recording apparatus, it goes without saying, however, that a configuration of color image recording apparatus according to the present invention can be applied to an image output terminal for an information processing apparatus such as computer, a copying apparatus combined with a scanner, a facsimile apparatus with transmission & receiving functions, et cetera.

Further note that the above described embodiment exemplifies an inkjet printer, the applicable field of the present invention, however, is in no way limited to an inkjet printer, but is applicable to an image recording apparatus such as thermal printer using a line type head.

What is claimed is:

1. A color image recording apparatus, comprising:
a plurality of recording heads respectively corresponding to a plurality of ink colors for recording an image;
a recording element selection unit for selecting a recording element from each of the plurality of recording heads based on information about respective relative positions of the plurality of recording heads, wherein each selected recording element forms a dot or a plurality of dots of a corresponding color constituting a predetermined pixel;
a shift amount calculation unit for calculating an amount of shift in color image data for each recording head based on relative positions of the corresponding recording elements which form a same pixel and which have been selected by the recording element selection process; and
a shift unit for shifting the color image data for each recording head by the calculated shift amount,
wherein the recording element selection unit selects the dot or the plurality of dots of each color so that a difference between minimum and maximum values of coordinates of the dot or the plurality of dots of each color, on a coordinate axis that is parallel to a recording element row, becomes a minimum from among the plurality of dots respectively formed by the recording elements of the respective recording heads, and selects the recording element in the respective recording heads forming the selected dots as the recording elements constituting the same pixel.

2. A color image recording apparatus, comprising:
a plurality of color recording heads respectively corresponding to a plurality of ink colors for recording an image; and
a control unit for selecting respective nozzles of the plurality of color recording heads;
wherein,
when defining a discretionary one recorded dot in a first color as "a",
two recorded dots in a second color sandwiching the recorded dot "a" and adjacent thereto are defined as b1 and b2,
two recorded dots in a third color sandwiching the recorded dot "a" and adjacent thereto are defined as c1 and c2,
two recorded dots in a fourth color sandwiching the recorded dot "a" and adjacent thereto are defined as d1 and d2, and
either one selected from the recorded dot b1 and the recorded dot b2 is defined as b, either one selected from the recorded dot c1 and the recorded dot c2 is defined as c, and either one selected from the recorded dot d1 and the recorded dot d2 is defined as d;
the control unit selects nozzles A, B, C and D of the respective color recording heads forming respective recorded dots so that a difference between minimum and maximum values of coordinates of the respective recorded dots, a, b, c and d, on a coordinate axis that is parallel to a recording element row, becomes a minimum, and image data for a same pixel is inputted into each of the selected nozzles, A, B, C and D.

3. A color image recording method for a color image recording apparatus including a plurality of recording heads respectively corresponding to a plurality of ink colors for recording an image, the color image recording method comprising:

a recording element selection process for selecting a recording element from each of the plurality of recording heads based on information about respective relative positions of the plurality of recording heads, wherein each selected recording element forms a dot or a plurality of dots of a corresponding color constituting a predetermined pixel;

a shift amount calculation process for calculating an amount of shift in color image data for each recording head based on relative positions of the corresponding recording elements which form a same pixel and which have been selected by the recording element selection process; and a shift process for shifting the color image data for each recording head by the calculated shift amount, wherein the recording element selection process selects the dot or the plurality of dots of each color so that a difference between minimum and maximum values of coordinates of the dot or the plurality of dots of each color, on a coordinate axis that is parallel to a recording element row, becomes a minimum from among the plurality of dots respectively formed by the recording elements of the respective recording heads, and selects the recording element in the respective recording heads forming the selected dots as the recording elements constituting the same pixel.

4. A color image recording method, comprising:

when defining a discretionary one recorded dot in a first color as "a", two recorded dots in a second color sandwiching the recorded dot "a" and adjacent thereto are defined as b1 and b2, two recorded dots in a third color sandwiching the recorded dot "a" and adjacent thereto are defined as c1 and c2, two recorded dots in a fourth color sandwiching the recorded dot "a" and adjacent thereto are defined as d1 and d2, and either one selected from the recorded dot b1 and the recorded dot b2 is defined as b, either one selected from the recorded dot c1 and the recorded dot c2 is defined as c, and either one selected from the recorded dot d1 and the recorded dot d2 is defined as d;

selecting nozzles A, B, C and D of respective color recording heads which form respective recorded dots so that a difference between minimum and maximum values of coordinates of the respective recorded dots, a, b, c and d, on a coordinate axis that is parallel to a recording element row, becomes a minimum, and image data for a same pixel is inputted into each of the selected nozzles, A, B, C and D.

* * * * *